United States Patent
Hall

(10) Patent No.: US 9,127,573 B2
(45) Date of Patent: Sep. 8, 2015

(54) ARRANGEMENT AND METHOD FOR CONVERTING THERMAL ENERGY TO MECHANICAL ENERGY

(75) Inventor: Ola Hall, Stockholm (SE)

(73) Assignee: SCANIA CV AB (SE)

( * ) Notice: Subject to any disclaimer, the term of this patent is extended or adjusted under 35 U.S.C. 154(b) by 138 days.

(21) Appl. No.: 13/990,073

(22) PCT Filed: Nov. 22, 2011

(86) PCT No.: PCT/SE2011/051399
§ 371 (c)(1),
(2), (4) Date: Jun. 26, 2013

(87) PCT Pub. No.: WO2012/074457
PCT Pub. Date: Jun. 7, 2012

(65) Prior Publication Data
US 2013/0276446 A1    Oct. 24, 2013

(30) Foreign Application Priority Data

Dec. 1, 2010 (SE) .................................. 1051269

(51) Int. Cl.
*F02G 3/00* (2006.01)
*F01K 23/10* (2006.01)
*F01K 23/06* (2006.01)
*F01N 5/02* (2006.01)
*F02G 5/02* (2006.01)

(52) U.S. Cl.
CPC ............ *F01K 23/101* (2013.01); *F01K 23/065* (2013.01); *F01N 5/02* (2013.01); *F02G 5/02* (2013.01); *Y02T 10/16* (2013.01); *Y02T 10/166* (2013.01)

(58) Field of Classification Search
None
See application file for complete search history.

(56) References Cited

U.S. PATENT DOCUMENTS

| 3,945,210 | A | * | 3/1976 | Chapin ............................. 60/618 |
| 4,120,157 | A | * | 10/1978 | Tang .................................. 60/618 |
| 2003/0145583 | A1 | | 8/2003 | Tanaka et al. |
| 2004/0050050 | A1 | * | 3/2004 | Bloch et al. ...................... 60/651 |
| 2004/0050052 | A1 | * | 3/2004 | Niikura et al. ................... 60/670 |

(Continued)

FOREIGN PATENT DOCUMENTS

DE  10 2009 050 068 A1   4/2011
JP  60-192809   10/1985

(Continued)

OTHER PUBLICATIONS

Translation of 2008231981, Kasuya Junichiro, Oct. 2, 2008.*

(Continued)

*Primary Examiner* — Jesse Bogue
(74) *Attorney, Agent, or Firm* — Ostrolenk Faber LLP

(57) ABSTRACT

An arrangement and a method for converting thermal energy to mechanical energy includes a circulation unit (4) a refrigerant in the a circuit (3), an evaporator (6) for the refrigerant, a turbine (9) driven by vaporised refrigerant, a condenser (12) cooling the refrigerant to condense, and an accumulator tank (14) for storage of the refrigerant is not being circulated in the line circuit (3). A control device estimates the degree of filling of the line circuit (3) with refrigerant at which the turbine (9) achieves a substantially optimum effect, and controls the flow of refrigerant between the line circuit (3) and the accumulator tank (14) to achieve the estimated degree of filling the line circuit (3) with refrigerant.

8 Claims, 3 Drawing Sheets

(56) References Cited

U.S. PATENT DOCUMENTS

| | | | |
|---|---|---|---|
| 2005/0072182 A1* | 4/2005 | Taniguchi et al. | 62/467 |
| 2009/0071156 A1 | 3/2009 | Nishikawa et al. | |
| 2010/0287920 A1* | 11/2010 | Duparchy | 60/320 |
| 2011/0167818 A1* | 7/2011 | Tsuchino et al. | 60/618 |

FOREIGN PATENT DOCUMENTS

| | | |
|---|---|---|
| JP | 2008-133727 | 6/2008 |
| JP | 2008-231981 | 10/2008 |
| JP | 2010 018060 | 1/2010 |
| WO | WO 2010/070786 A1 | 6/2010 |

OTHER PUBLICATIONS

International Search Report dated Mar. 5, 2012 issued in corresponding International Patent Application No. PCT/SE2011/051399.

International Preliminary Report on Patentability dated Mar. 27, 2013 issued in corresponding International Patent Application No. PCT/SE2011/051399.

* cited by examiner

ARRANGEMENT AND METHOD FOR CONVERTING THERMAL ENERGY TO MECHANICAL ENERGY

CROSS-REFERENCE TO RELATED APPLICATIONS

The present application is a 35 U.S.C. §§371 national phase conversion of PCT/SE2011/051399, filed Nov. 22, 2011, which claims priority of Swedish Application No. 1051269-7, filed Dec. 1, 2010, the contents of which are incorporated by reference herein. The PCT International Application was published in the English language.

BACKGROUND TO THE INVENTION AND PRIOR ART

The present invention relates to an arrangement and a method for converting thermal energy to mechanical energy.

When fuel is burnt in a combustion engine in a vehicle, chemical energy is converted to mechanical energy to propel the vehicle. However, a substantial part of the chemical energy is converted to thermal energy which is released to the surroundings in various ways. An example of this is the thermal energy in the exhaust gases which are discharged to the surroundings. Another example is the thermal energy present in various kinds of warm media in the vehicle which is actively cooled away in various types of cooling devices. An example of such warm media is the coolant in cooling systems which cool the engine and possibly other components of the vehicle. The warm coolant is usually cooled in a radiator by surrounding air at the front portion of the vehicle. Many combustion engines are supercharged, which entails compressed air being supplied to them. The charge air is cooled in at least one charge air cooler before being led into the engine. To reduce discharges of nitrogen oxides, part of the exhaust gases may be recirculated. The recirculating exhaust gases are cooled in at least one EGR cooler before being mixed with the charge air and led into the engine etc.

US 2003/0145583 refers to an example of a so-called WHR (waste heat recovery) system in a vehicle. WHR systems are used to convert thermal energy to mechanical energy. A WHR system comprises a circuit with a pump which circulates water in a line circuit. The line circuit comprises an evaporator in which the water is vaporised by heat from the engine's exhaust gases, and a turbine which is driven by the vapour. When the vapour expands through the turbine, part of its thermal energy is converted to mechanical energy. A power transmission system comprising inter alia a planetary gear transmits the turbine's motion to an output shaft of the engine and/or to an electrical energy generator.

SUMMARY OF THE INVENTION

The object of the present invention is to propose an arrangement capable of converting thermal energy to mechanical energy in an effective way.

This object is achieved with the arrangement of the invention. The arrangement comprises the basic components which form part of a conventional WHR system. The efficiency of a WHR system varies with the degree to which the line circuit is filled with the refrigerant. Optimum filling of a WHR system with refrigerant is usually dimensioned for the operating state in which it is subject to maximum load. This results in lower efficiency in other operating states in which the WHR system is not subject to maximum load. The present invention estimates the degree of filling of the line circuit with refrigerant at which the turbine achieves substantially optimum running in prevailing operating conditions, which is then adjusted as necessary to the estimated value. This means that the line circuit will always have a degree of filling which results in substantially optimum running of the turbine and substantially optimum production of mechanical energy.

According to a preferred embodiment of the invention, the control system is adapted to estimating the degree of filling of the line circuit with refrigerant at which the refrigerant led into the evaporator has substantially no supplementary cooling. When such is the case, there is no need to use up any thermal energy by initially warming the refrigerant to the vaporisation temperature before the evaporation process begins. All of the thermal energy from the heat source may thus be utilised to vaporise the refrigerant and subject it to any necessary supplementary heating before it is led to the turbine. The vaporised refrigerant may thus cause the turbine to achieve substantially optimum running and substantially optimum production of mechanical energy in all operating states.

According to a preferred embodiment of the present invention, said circulation means is a pump situated between the condenser and the evaporator in the line circuit.

For the pump to function in a desired way, all of the refrigerant led to it has to be in liquid form. To ensure this, it is appropriate that the refrigerant leaving the condenser should have a certain supplementary cooling. However, this supplementary cooling should be as little as possible and may be of the order of 1 to 3 degrees. When such is the case, the refrigerant led to the evaporator may have a smallest possible supplementary cooling. Supplementary cooling of this magnitude affects the efficiency only marginally and results in substantially optimum running of the turbine. The arrangement may comprise, in the line circuit between the pump and the evaporator, a heat exchanger in which the refrigerant is intended to be warmed before it is led into the evaporator. In this case the refrigerant may in the heat exchanger undergo warming which compensates for any supplementary cooling in the condenser. The refrigerant may then be led into the evaporator without any supplementary cooling.

According to a preferred embodiment of the present invention, said control means is a control unit adapted to receiving information from at least one sensor which monitors a parameter on the basis of which the control unit estimates the degree of filling with refrigerant at which the turbine achieves a substantially optimum effect. The control unit may be a computer unit with suitable software for the purpose. Said sensor may be adapted to monitoring the temperature and/or pressure of the refrigerant at a location between the condenser and the evaporator in the line circuit. Knowing the pressure and temperature of the refrigerant makes it possible to determine the amount of supplementary cooling by means of, for example, a Mollier diagram. Alternatively, the control unit may receive information from sensors which detect a parameter on the basis of which the current load upon the evaporator and/or the condenser can be estimated. In this case the control unit may contain stored information about appropriate degrees of filling with refrigerant when the evaporator and/or the condenser are at different loads.

According to another preferred embodiment of the present invention, said control means comprises at least one line extending between the line system and the accumulator tank, and flow means adapted to leading refrigerant between the line circuit and the accumulator tank at times when the degree of filling of the line circuit with refrigerant needs adjusting. Such a line makes it possible for the degree of filling of the line circuit with refrigerant to be adjusted easily and effectively in different operating states. Said line may be connected to the line circuit at a location where the refrigerant is at a different pressure from that in the accumulator tank, and said flow means comprises in the line a valve which can be put into a closed state and at least one open state. If the line is connected to the line circuit at a location where the refrigerant is at a lower pressure than in the accumulator tank, this results in replenishment of the refrigerant in the line circuit when the valve opens. If the line is connected to the line circuit at a location where the refrigerant is at a higher pressure than in the accumulator tank, this results in draining of refrigerant from the line circuit when the valve is open. Alternatively, said flow means comprises a pump situated in the line between the line circuit and the accumulator tank. With advantage, the pump is reversible to make it possible to use the same line both to supply refrigerant to the line circuit and to drain it from the line circuit.

According to an embodiment of the present invention, said heat source is a warm medium in a vehicle powered by a combustion engine. In vehicles there are many media which may serve as heat source for the aforesaid arrangement. The engine's exhaust gases are such a heat source. Other possible heat sources comprise the coolant which circulates in the vehicle's cooling system. Further possible heat sources are charge air and recirculating exhaust gases which are led to the engine. These media vary in flow and temperature in different operating states of the engine. The arrangement defined above makes it possible for a turbine to achieve substantially optimum running even when the flow and temperature of the aforesaid media vary.

The object mentioned in the introduction is also achieved with the method of the invention. The method comprises the steps of estimating the degree of filling with refrigerant at which the turbine achieves a substantially optimum effect, and of controlling the flow of refrigerant between the line circuit and the accumulator tank in such a way that the estimated degree of filling with refrigerant is achieved in the line system.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
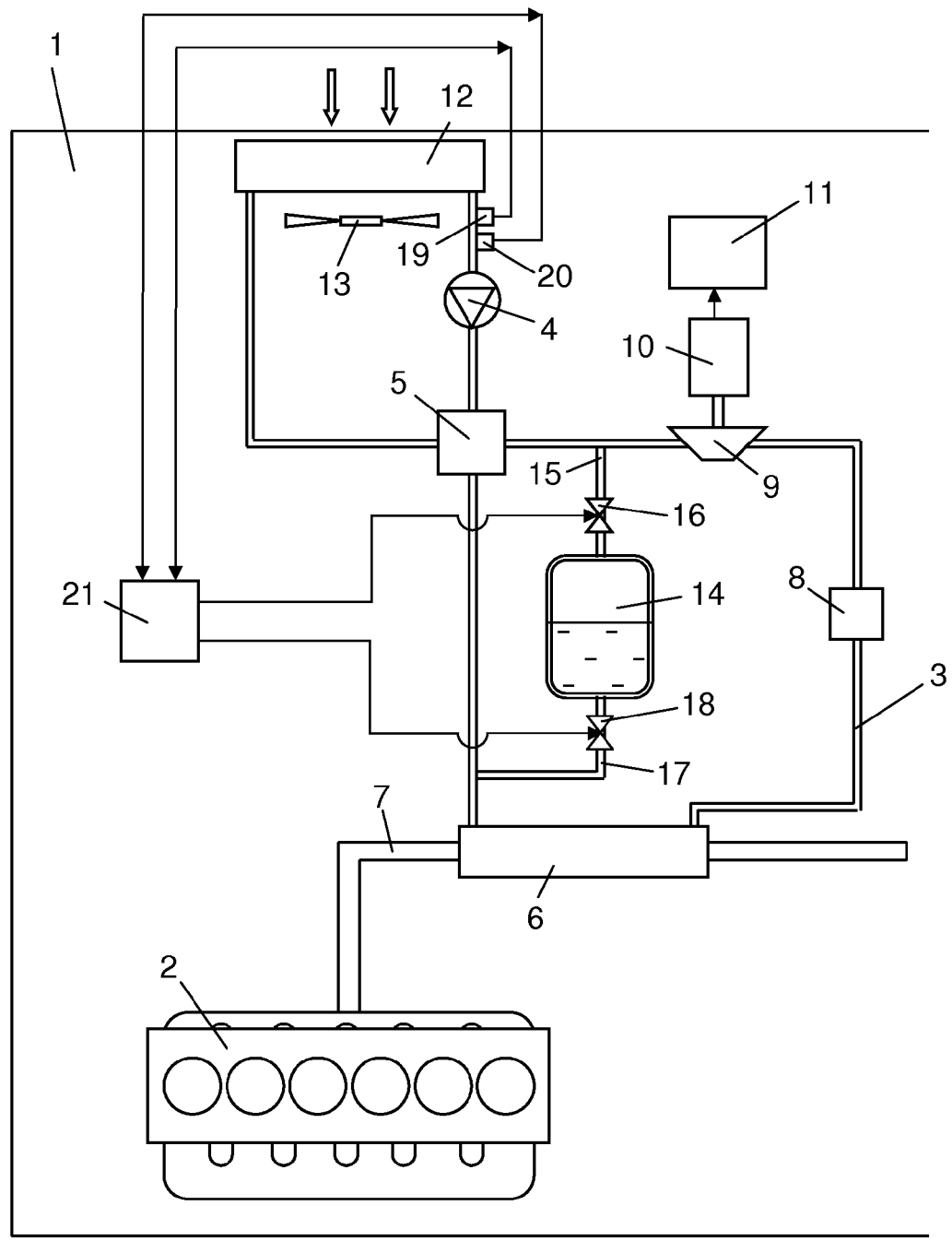
FIG. 1 depicts an arrangement for conversion of thermal energy to mechanical energy.

FIG. 1 depicts an arrangement comprising a number of components used in a conventional WHR (waste heat recovery) system. WHR systems are used in various contexts for converting thermal energy to mechanical energy. In this case the arrangement is used to extract mechanical energy from thermal energy in exhaust gases which are discharged from a combustion engine 2 in a schematically depicted vehicle 1. The arrangement comprises a line circuit 3 with a circulating refrigerant. The refrigerant is in liquid form when it is pressurised in the line circuit 3 by a pump 4. The pump 4 leads the refrigerant to a heat exchanger 5 which may be a so-called recuperator. The refrigerant is led from the heat exchanger 5 to an evaporator 6. The refrigerant is warmed in the evaporator 6 by exhaust gases which are led through an exhaust line 7 of the engine 2. The temperature and flow of the exhaust gases in the exhaust line 7 vary with the load upon the engine 2. If the engine 2 is a diesel engine, the exhaust gases may be at a temperature of up to about 600-700° C.

The refrigerant is intended to be subjected in the evaporator 6 to warming by the exhaust gases so that it becomes vaporised. The resulting gaseous refrigerant is led from the evaporator 6 to a supplementary heater 8. Where necessary, the refrigerant may here undergo extra warming in the supplementary heater 8 to ensure that all of it is in gaseous form when it reaches a turbine 9. The refrigerant then expands through the turbine 9. Part of the thermal energy in the refrigerant is here converted to mechanical energy. In this case the turbine 9 drives a generator 10. The mechanical energy extracted is thus converted to electrical energy which is stored in an energy store 11. The stored electrical energy may with advantage be used for propulsion of the vehicle 1 or to operate components of the vehicle. Alternatively, the turbine 9 may be connected to a flywheel or similar mechanical energy storage unit which is connectable to the vehicle's power train. When the flywheel is connected to the power train, the vehicle is provided with extra propulsive power.

When the refrigerant has expanded in the turbine 9, it will be at a lower pressure and a lower temperature. The gaseous refrigerant is then led through the aforesaid heat exchanger 5 in which it undergoes slight cooling. The gaseous refrigerant is thereafter led to a condenser 12 in which it is cooled to a temperature at which it condenses. In the example depicted, it is cooled in the condenser 12 by air at the temperature of the surroundings. An air fan 13 draws in the surrounding air which is led through the condenser 12. The gaseous refrigerant thus changes to liquid in the condenser 12. If cold coolant is available, the gaseous refrigerant may alternatively be cooled by coolant in the condenser. The liquid refrigerant is drawn from the condenser 12 to the pump 4. The liquid refrigerant reaching the heat exchanger 5 will be at a lower temperature than the gaseous refrigerant led through the heat exchanger at a location upstream of the condenser 12. The liquid refrigerant thus undergoes slight warming in the heat exchanger 5 before it reaches the evaporator 6. The circulating refrigerant undergoes a pressure drop in the turbine 9. The pump 4 imparts a corresponding pressure rise to the refrigerant. The refrigerant will thus be at a higher pressure in the portion of the line circuit 3 which extends from the pump 4 to the turbine 9 than in the portion of the line circuit 3 which extends from the turbine 9 to the pump 4 with respect to the intended direction of refrigerant circulation in the line circuit 3. The turbine 9 makes it possible for the thermal energy from the exhaust gases in the exhaust line 7 to be utilised and converted to mechanical energy. The mechanical energy is in this case converted to electrical energy in the generator 11. The mechanical or electrical energy is used with advantage to propel the vehicle 1. The vehicle may thus acquire more capacity without any supply of extra fuel to the engine 2.

The arrangement comprises also an accumulator tank 14 to store refrigerant which is not being used in the line circuit 3. The accumulator tank 14 is adapted to storing the refrigerant at a temperature and pressure such that there are suitable amounts of the refrigerant in liquid phase and gas phase in the accumulator tank 14. The arrangement comprises a first line 15 with a valve 16. The first line 15 extends from an upper portion of the accumulator tank 14 to a region of the line circuit 3 in which the refrigerant is at a lower pressure than in the accumulator tank 14. When the valve 16 opens, gaseous refrigerant is led from the accumulator tank 14 to the line circuit 3 via the first line 15. The arrangement comprises a second line 17 with a valve 18. The second line 17 extends from a lower portion of the accumulator tank 14 to a region of the line circuit 3 in which the refrigerant is at a higher pressure than in the accumulator tank 14. When the valve 18 opens, liquid refrigerant is led from the line circuit 3 to the accumulator tank 14. A temperature sensor 19 and a pressure sensor 20 are situated in the line circuit 3 at a location downstream of the condenser 12 and upstream of the pump 4. A control unit 21 is adapted to receiving information from the temperature sensor 19 and the pressure sensor 20 during operation. The control unit 21 is adapted to opening one of the valves 16, 18 to adjust the degree of filling with refrigerant of the line circuit 3.

When the load upon the engine 2 changes, the flow and temperature of the exhaust gases in the exhaust line 7 vary. Operating states in which there is heavy load upon the engine 2 result in a large flow of exhaust gases at a high temperature through the exhaust line 7. In such operating states the turbine 9 can recover a relatively large amount of thermal energy from the exhaust gases. Low load upon the engine 2 results in a significantly smaller flow of exhaust gases at a lower temperature through the exhaust line 7. In such operating states the turbine 9 can recover significantly less thermal energy from the exhaust gases. It is nevertheless desirable to recover as much thermal energy as possible from the exhaust gases in all operating conditions. Optimum recovery of thermal energy is achieved at times when the liquid refrigerant led into the evaporator 6 has no supplementary cooling. When such is the case, substantially no thermal energy from the exhaust gases need be used to warm the refrigerant in the evaporator 6 to a vaporisation temperature, so substantially all of the thermal energy from the exhaust gases can be used to vaporise the refrigerant in the evaporator 6. In this case an optimum amount of thermal energy can be converted to mechanical energy in the turbine 9.

Figure 2:
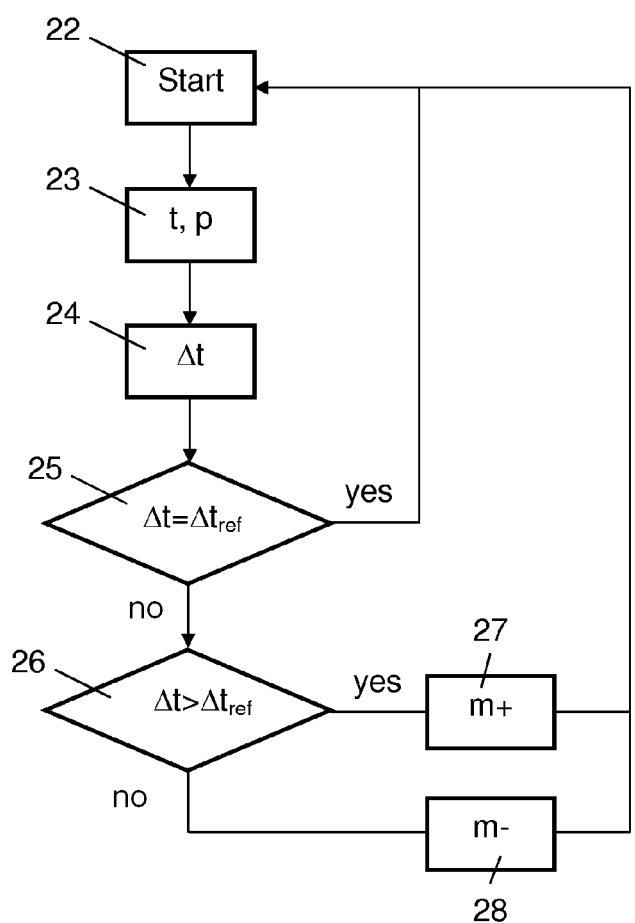
FIG. 2 is a flowchart illustrating a method for operation of the arrangement in FIG. 1

FIG. 2 is a flowchart illustrating a method during operation of the arrangement in FIG. 1. The process starts at step 22. During operation, the control unit 21 receives at step 23 information from the temperature sensor 19 and the pressure sensor 20 about the temperature t and pressure p of the refrigerant. The temperature sensor 19 and the pressure sensor 20 are situated at a location in the line circuit 3 downstream of the condenser 12 and upstream of the pump 4 with respect to the intended direction of refrigerant flow in the line circuit 3. On the basis of this information, the control unit can estimate the supplementary cooling $\Delta t$ in the condenser 12 by means of, for example, a Mollier diagram for the particular refrigerant. To ensure that no refrigerant in vapor form reaches the pump 4, supplementary cooling in the form of a reference value $\Delta t_{ref}$ of a few degrees may be acceptable. The reference value of the supplementary cooling $\Delta t_{ref}$ in the condenser corresponds with advantage to the temperature rise which the refrigerant undergoes in the heat exchanger 5. This makes it possible for liquid refrigerant without supplementary cooling to be led into the evaporator 6. The control unit 21 compares at step 25 whether the respective supplementary cooling $\Delta t$ of the refrigerant corresponds to the reference value $\Delta t_{ref}$. If such is the case, the control unit 21 will find that the amount of refrigerant in the line circuit 3 is correct. The process then starts again at step 22.

If the control unit 21 finds that the supplementary cooling $\Delta t$ is not equal to the reference value $\Delta t_{ref}$, the method moves on to step 26, where the control unit 21 decides whether the supplementary cooling $\Delta t$ is too little or too great relative to the reference value $\Delta t_{ref}$. If the supplementary cooling $\Delta t$ of the refrigerant in the condenser 12 is too great, the control unit 21 opens at step 27 a valve 16 in the first line 15. The first line 15 will thus be connected to a portion of the line circuit 3 in which there is a lower pressure than in the accumulator tank 14. Gaseous refrigerant will therefore be drawn into the line circuit 3 when the valve 16 is open. The control unit 21 can also estimate, at step 27, how much refrigerant needs to be added to eliminate the difference between the current supplementary cooling $\Delta t$ and the reference value $\Delta t_{ref}$. The control unit 21 may keep the first valve 16 open for a period of time so that the estimated amount of refrigerant is added. The method then starts again at step 22. When the amount of refrigerant increases in the line circuit 3, more of it accumulates in the condenser 12 and the supplementary cooling of the refrigerant leaving the condenser 12 decreases.

If the supplementary cooling $\Delta t$ of the refrigerant in the condenser 12 is too little, the control unit 21 opens at step 28 the valve 18 in the second line 17. The second line 17 is thus connected to a portion of the line circuit 3 in which there is a higher pressure than in the accumulator tank 14. Liquid refrigerant is therefore pushed into the accumulator tank 14 from the line circuit 3 when the valve 18 is open. The control unit 21 can also estimate at step 28 how much refrigerant need be led out from the line circuit 3 to eliminate the difference between the respective supplementary cooling $\Delta t$ and the reference value $\Delta t_{ref}$. The control unit 21 may keep the valve 18 open for a period of time so that the estimated amount of refrigerant is led out from the line circuit 3. The method then starts again at step 22. When the amount of refrigerant decreases in the line circuit 3, less of it accumulates in the condenser 12 and the supplementary cooling of the refrigerant leaving the condenser 12 increases.

Figure 3:
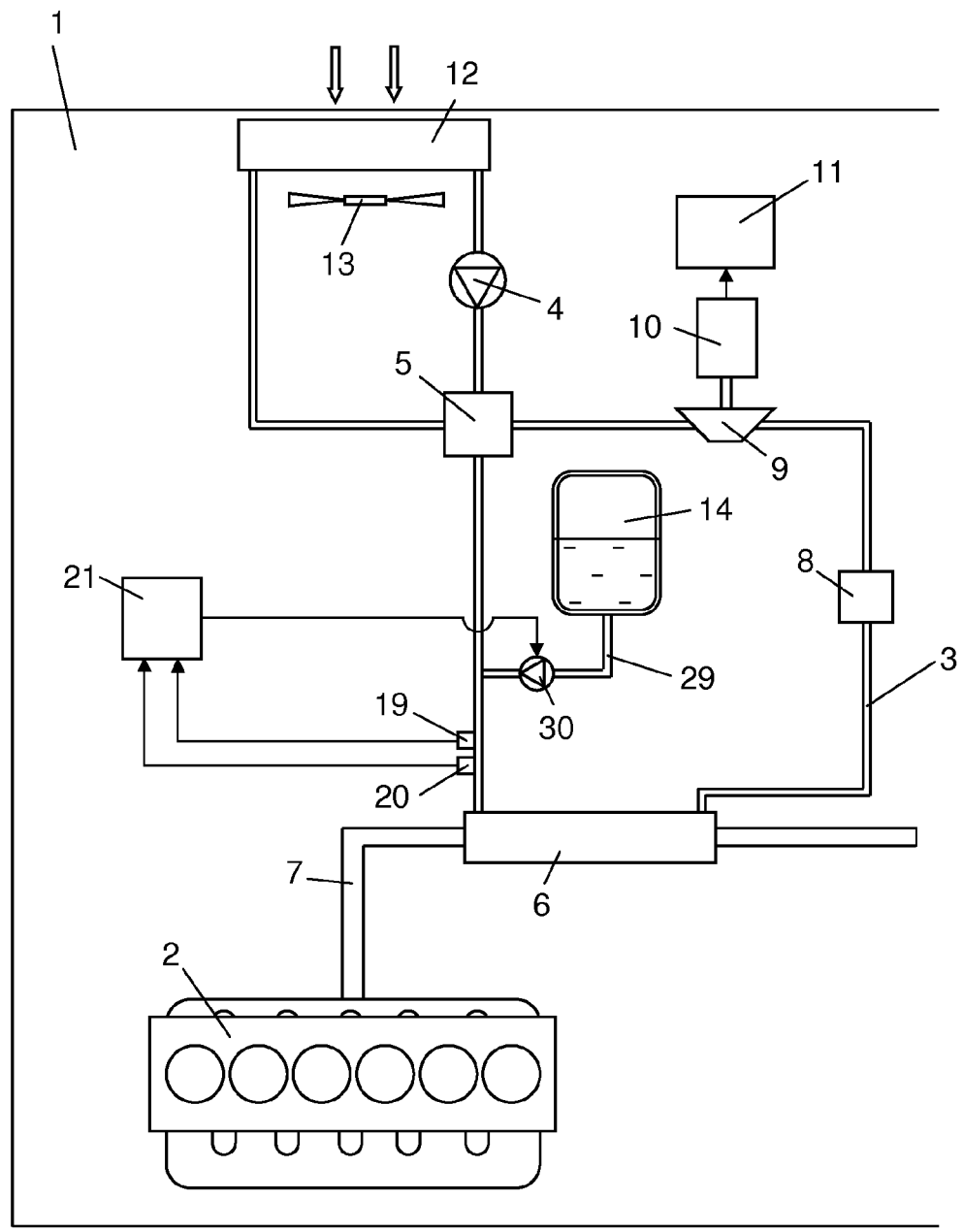
FIG. 3 depicts an arrangement according to an alternative embodiment for conversion of thermal energy to mechanical energy.

FIG. 3 depicts an alternative embodiment of the arrangement. In this case the accumulator tank 14 is connected to the line circuit 3 by a line 29. A reversible pump 30 is provided in the line 29. The control unit 21 can here control the pump 30 so that degree of filling of the line circuit 3 with refrigerant may be both increased and reduced. In this case the control unit 21 receives information from a temperature sensor 19 and a pressure sensor 20 which are situated in the line circuit 3 at a location downstream of the heat exchanger 5 and upstream of the evaporator 6. The control unit 21 can then directly decide whether the liquid refrigerant led to the evaporator has supplementary cooling or not.

The invention is in no way restricted to the embodiment to which the drawing refers but may be varied freely within the scopes of the claims. In the embodiments depicted, the heat in the exhaust gases is utilised as heat source to vaporise the refrigerant and drive the turbine. It is nevertheless possible to use any desired heat sources to vaporise the refrigerant in the evaporator, particularly heat sources which have a varying thermal power and need cooling. Such heat sources might be coolant in the vehicle's cooling system, charge air led to supercharged combustion engines and recirculating exhaust gases.

The invention claimed is:

1. An arrangement for converting thermal energy to mechanical energy, comprising:
   a line circuit;
   a pump configured for circulating a refrigerant in the line circuit;
   an evaporator to which the refrigerant is circulated and where the refrigerant is vaporised by a heat source;
   a turbine in the line circuit, located and configured to be driven by the vaporised refrigerant;
   a condenser in which the refrigerant is cooled so that it condenses;

an accumulator tank for storage of the refrigerant which is not being circulated in the line circuit;

a computer unit configured to receive information from at least one sensor which monitors a parameter, the information being used by the computer unit as the basis for which the computer unit estimates the degree of filling of the line circuit with refrigerant at which the turbine achieves an optimum effect in prevailing operating conditions, and to control the flow of refrigerant between the line circuit and the accumulator tank such that the estimated degree of filling with refrigerant is achieved in the line circuit;

a first connecting line extending between the line circuit and the accumulator tank and a first valve connected to the first connecting line and configured for leading the refrigerant from the accumulator tank to the line circuit at times when the degree of filling of the line circuit with refrigerant needs to be increased as estimated by the computer unit; and a second connecting line extending between the line circuit and the accumulator tank and a second valve connected to the second connecting line and configured for leading the refrigerant from the line circuit to the accumulator tank at times when the degree of filling of the line circuit with refrigerant needs to be decreased, as estimated by the computer unit;

the first valve, leading the refrigerant in gaseous form from the accumulator tank to a region of the line circuit where the refrigerant is in a gas phase via the first connecting line, and the second valve leading the refrigerant in liquid form from the accumulator tank to a region of the line circuit where the refrigerant is in liquid phase via the second connecting line, the line circuit being subdivided into a first line subcircuit and a second line subcircuit sharing a corner common to the first line subcircuit and the second line subcircuit, the evaporator and the turbine being connected to the first line subcircuit and the condenser and the pump being connected to the second line subcircuit.

2. An arrangement according to claim 1, wherein the computer unit estimates the degree of filling of the line circuit with refrigerant at which the refrigerant led into the evaporator has substantially no supplementary cooling.

3. An arrangement according to claim 1, wherein the pump is situated between the condenser and the evaporator in the line circuit.

4. An arrangement according to claim 3, further comprising a heat exchanger between the pump and the evaporator in the line circuit, the heat exchanger being configured and located for warming the refrigerant before the refrigerant is led into the evaporator.

5. An arrangement according to claim 1, wherein the at least one sensor monitors the temperature and/or pressure of the refrigerant at a location between the condenser and the evaporator in the line circuit.

6. An arrangement according to claim 1, wherein the first connecting line is connected to the line circuit at a location where the refrigerant is at a different pressure from a pressure in the accumulator tank, and the first valve is configured to be put into a closed position and into at least one open position.

7. An arrangement according to claim 1, wherein the heat source comprises a warm medium in a vehicle powered by a combustion engine.

8. A method for converting thermal energy to mechanical energy comprising:

circulating refrigerant in a line circuit;

providing a heat source for vaporizing the circulating refrigerant;

driving a turbine by the vaporised refrigerant, then cooling the refrigerant so that it condenses in a condenser, and storing the refrigerant which is not being circulated in the line circuit;

estimating that degree of filling of the line circuit with the refrigerant at which the turbine achieves an optimum effect in prevailing operating conditions, based on information received from at least one sensor which monitors a parameter; and controlling the flow of the refrigerant between the line circuit and the refrigerant stored in an accumulator tank such that the estimated degree of filling the line circuit with the refrigerant is achieved by leading the refrigerant from the accumulator tank to the line circuit at times when the degree of filling of the line circuit with the refrigerant needs to be increased and by leading the refrigerant from the line circuit to the accumulator tank at times when the degree of filling of the line circuit with the refrigerant needs to be decreased, and leading gaseous refrigerant from the accumulator tank to a region of the line circuit where the refrigerant is in gas phase, or leading liquid refrigerant from the accumulator tank to a region of the line circuit where the refrigerant is in liquid phase, the line circuit being subdivided into a first line subcircuit and a second line subcircuit sharing a corner common to the first line subcircuit and the second line subcircuit, the first line subcircuit enclosing the accumulator tank, and the condenser being connected to the second line subcircuit.

\* \* \* \* \*